United States Patent
Zearing et al.

(10) Patent No.: US 9,152,732 B2
(45) Date of Patent: Oct. 6, 2015

(54) BROWSER CACHE ASSIST FOR ACCESSING WEB-BASED CONTENT

(75) Inventors: David Zearing, Sammamish, WA (US); Michael Mastrangelo, Seattle, WA (US); Emmanuel Miranda Steiner, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 259 days.

(21) Appl. No.: 13/287,146

(22) Filed: Nov. 2, 2011

(65) Prior Publication Data
US 2013/0110906 A1   May 2, 2013

(51) Int. Cl.
*G06F 15/16* (2006.01)
*G06F 17/30* (2006.01)

(52) U.S. Cl.
CPC .................. *G06F 17/30902* (2013.01)

(58) Field of Classification Search
CPC .......... G06F 17/30902; G06F 17/3089; G06F 17/30893; H04L 67/02; H04L 67/2842; H04L 69/329; H04L 29/06; H04L 67/42; H04L 67/1095; H04L 67/142; H04L 67/28; H04L 67/2847; H04L 67/2852; H04L 67/289
USPC .......................................................... 709/203
See application file for complete search history.

(56) References Cited

U.S. PATENT DOCUMENTS

| | | | | |
|---|---|---|---|---|
| 7,496,607 | B2 * | 2/2009 | Sollicito et al. | 1/1 |
| 7,778,987 | B2 * | 8/2010 | Hawkins | 707/705 |
| 7,970,816 | B2 * | 6/2011 | Chess et al. | 709/203 |
| 8,065,275 | B2 * | 11/2011 | Eriksen et al. | 707/661 |
| 8,082,299 | B2 * | 12/2011 | Chess et al. | 709/203 |
| 2003/0005047 | A1 | 1/2003 | Seki et al. | |
| 2003/0182357 | A1 | 9/2003 | Chess et al. | |
| 2004/0181576 | A1 | 9/2004 | Lin et al. | |
| 2006/0168348 | A1 | 7/2006 | Casalaina | |
| 2008/0098093 | A1 * | 4/2008 | Simon et al. | 709/219 |
| 2009/0254589 | A1 | 10/2009 | Nair et al. | |
| 2010/0235321 | A1 * | 9/2010 | Shukla et al. | 707/610 |
| 2010/0257230 | A1 * | 10/2010 | Kroeger et al. | 709/203 |
| 2011/0161403 | A1 | 6/2011 | Fu | |
| 2012/0117141 | A1 * | 5/2012 | Beaver et al. | 709/203 |
| 2012/0185835 | A1 * | 7/2012 | Klots et al. | 717/152 |

OTHER PUBLICATIONS

Shacham, et al., "Client Side Caching for TLS", Retrieved at <<http://crypto.stanford.edu/~dabo/papers/fasttrack.pdf>>, ACM Transactions on information and System Security (TISSEC), vol. 7, No. 4, Nov. 2004, pp. 1-26.

* cited by examiner

*Primary Examiner* — Douglas W Owens
*Assistant Examiner* — Monica C King
(74) *Attorney, Agent, or Firm* — Tom Wong; Danielle Holmes; Micky Minhas

(57) ABSTRACT

A web application residing in a client device generates a user interface containing data objects hosted on a remote server. The web application contains a web app cache storing the data objects rendered in a web page. As additional data objects are needed, the web application searches for them first in the web app cache, then a browser cache, before utilizing a web browser to retrieve the data objects from the remote server.

20 Claims, 10 Drawing Sheets

BROWSER CACHE ASSIST FOR ACCESSING WEB-BASED CONTENT

BACKGROUND

A file hosting service provides storage for a user's files on a remote server that may be accessed through a web-enabled computing device. A user may upload a digital file to the file hosting service from a web-enabled device. The file hosting service may allow the user to download the file from different web-enabled computing devices, to view and edit the files from different web-enabled computing devices in addition to organizing the files into folders and so forth.

The file hosting service may utilize a file hosting server to store the user's files. A user may interact with the file hosting server through a web browser to obtain web pages containing data requested by the user. For example, a user may request a listing of the user's files stored on the file hosting server. The user's web browser makes the request to the file hosting server and receives a web page depicting a listing of the user's files.

However, the processing of the user's request incurs the expense of a round trip from the user's computing device to the file hosting server and back to the user's computing device. The user requests the web page through a web browser on the user's web-enabled computing device which is sent to the file hosting server. The file hosting server obtains data from backend storage devices and then generates the web page which is transmitted to the user's web-enabled computing device, and finally to the web browser to render the web page. This round trip increases the response time of the user's request which may be too slow for some users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A web application residing in a client device generates a user interface containing data objects hosted on a remote server. The web application contains a web app cache storing the data objects rendered in a web page. As additional data objects are needed, the web application searches for them first in the web app cache, then the browser's cache, before making a network request to retrieve the data objects from the remote server.

When the data object is retrieved from the web app cache, the client device has the most current copy of the data object. When the data object is retrieved from the browser cache, the browser displays the data object while the web application retrieves the current copy from the remote server. In the event, the web app cache and the browser cache do not contain the data object, the web application makes a network request to obtain the data object from the remote server. The web application associates a unique URL containing a version to retrieve the data object from the remote server. If the version in the requested URL matches the version of the data object stored in the remote server, the retrieved data object is stored in the browser cache and the web app cache since it is the most current copy of the data object.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to a mechanism that maintains a local and current copy of a data object, hosted on a remote server, in a web browser cache. A web browser cache stores a local copy of a data object that was retrieved from a remote server. The data object may change dynamically over time and the local copy in the browser cache may not be the most current. A web application residing on a client device generates web pages containing the data objects. The web application utilizes a web app cache to store the most current copy of the data object in the client device in order to minimize the number of accesses to the remote server.

When a data object is needed by the web application, the web application searches the web app cache for the data object. If the data object is found in the web app cache, the web application updates the web page with the data object. If the data object is not found in the web app cache, the web application generates a URL for the web browser to obtain the data object. The web browser first searches the browser cache for the data object using the URL. If the data object is found in the browser cache, then the browser renders the local version of the data object from the browser cache. Concurrently, the web application retrieves a current copy of the data object from the remote server in order to ensure that the most current copy of the data object is stored in the client device. If the versions of the data object do not match, then the current version is rendered by the browser.

If the data object is not found in the browser cache, then the web browser requests the data object from the remote server. A request may contain a header and a URL. The URL contains a version that is a unique identifier associated with the data object. The remote server checks the version in the URL with the version of the data object stored on the remote server. If the versions match, the response from the server indicates that the browser may cache the response since it is a current copy of the data object.

The header may contain a transaction identifier that is used to indicate that the data object came from the remote server and is a current copy of the data object. If the header contains a transaction identifier in a request, the server includes the transaction identifier in the response. When the web application receives a response with the transaction identifier included in the response header, the web application knows that the received data object is the current version rather than a stale copy left in the browser cache.

A data object represents any web-accessible content. The data object may be any part or combination of content that may be displayed in a hierarchical configuration. Since the data object changes, a version identifier is associated with the data object in order to distinguish each version of a data object.

Figure 1A:
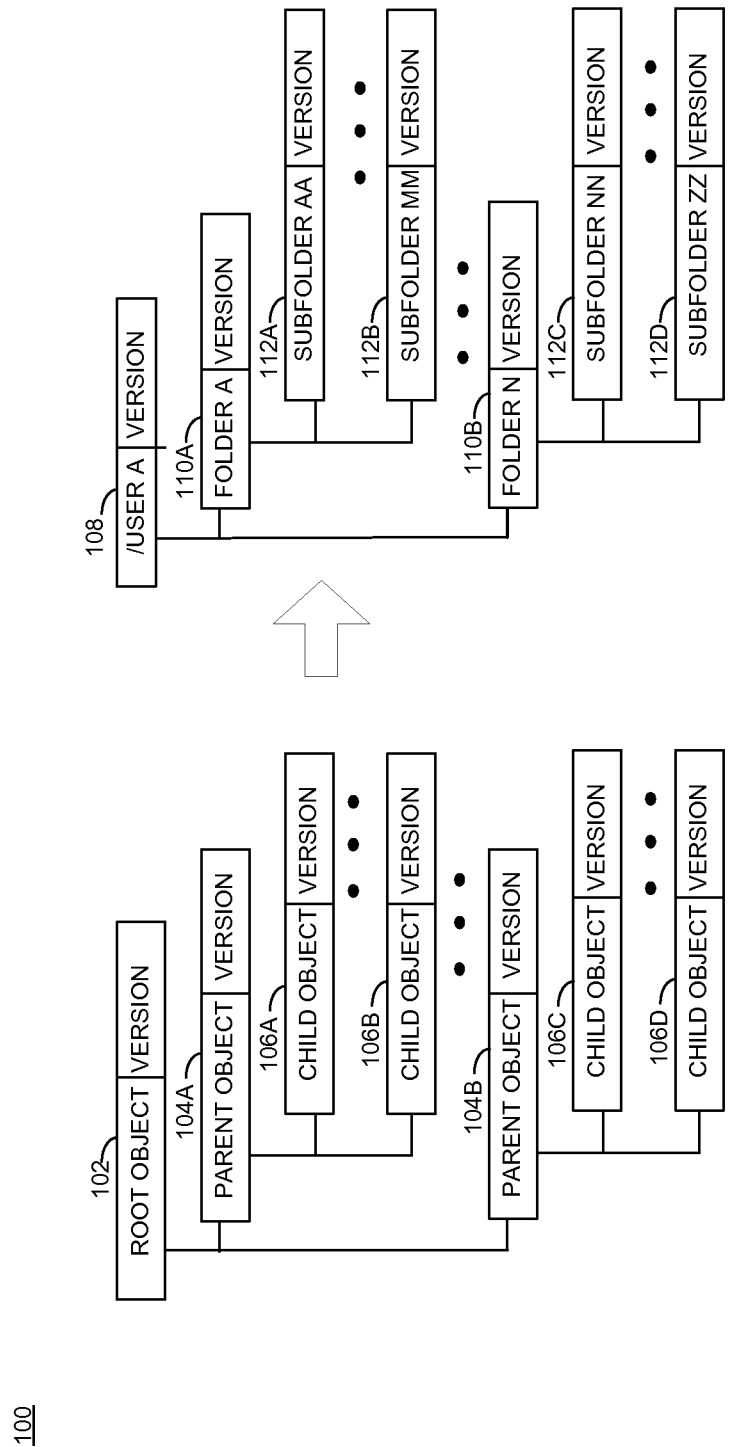
FIG. 1A illustrates an exemplary hierarchical structure of data objects representing web-based content from a file hosting server.

For example, referring to FIG. 1A, there is shown a hierarchical structure 100 of data objects stored on a remote server. The hierarchical structure may contain a root object 102 having one or more parent objects 104A-104B (collectively, "104") where each parent object 104 may have multiple child objects 106A-106D (collectively, "106"). The root object 102, the parent objects 104 and the child objects 106 are associated with a version. The version may be a timestamp indicating when the content associated with the data object was placed on a web page, stored in a server, created, and so on. The content associated with each data object may be a folder, a listing, or any type of digital file, such as a document, a photo, a message, email, digital voice recording, streamed data, and so forth.

In several embodiments, the hierarchical structure may be associated with a file system stored on a remote file hosting server. For example, as shown in FIG. 1A, the root object 102 may correspond to a user's root file directory 108 (e.g., /User A). The user's root file directory 108 may have a parent object that corresponds to Folder A 110A and a parent object that corresponds to Folder N 110B. Folder A 110A may have subfolder AA 112A and subfolder MM 112B. Folder 110B may have subfolder NN 112C and subfolder ZZ 112D. A data object may be the root directory, a parent directory, a child directory, or a file stored any where in the hierarchical structure, and any combination thereof.

Figure 1B:
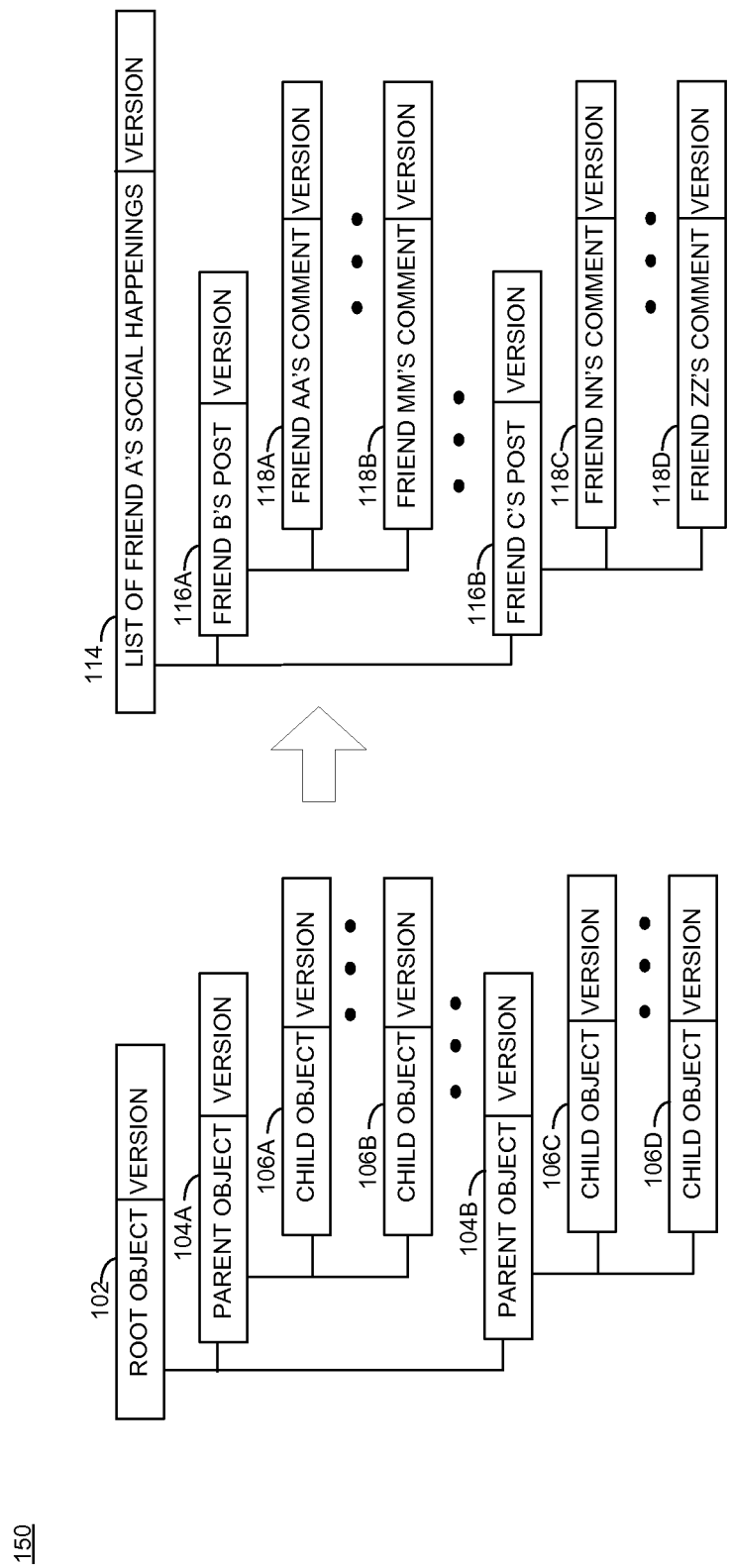
FIG. 1B illustrates an exemplary hierarchical structure of data objects representing web-based content from a social networking web site.

FIG. 1B shows a hierarchical structure 150 of data objects stored on a social networking web site. The hierarchical structure 150 may be associated with a listing of social happenings stored on the social networking web site. The web site may have a root object 102, multiple parent objects 104A-104B (collectively, '104'), where each parent object 104 may have several child objects 106A-106D (collectively, '106'). The root object may correspond to a list of Friend A's social happenings 114. The list of Friend A's social happenings 114 may have a parent object that corresponds to Friend B's post 116A and a parent object that corresponds to Friend C's post 116B. Friend B's post 116A may have child objects that correspond to Friend AA's comment 118A and Friend MM's comment 118B to Friend B's post 116A.

Likewise, Friend C's post 116B may have a child object that corresponds to Friend NN's comment 118C to Friend C's post 116B and a child object that corresponds to Friend ZZ's comment 118D to Friend C's post 116B. The data objects in this embodiment may be the list of Friend A's social happenings 114, Friend B's post 116A, Friend C's post 116B, Friend AA's comment 118A, Friend MM's comment 118B, Friend NN's comment 118C, Friend ZZ's comment 118D, and any combination thereof. Each data object contains a version that may be a timestamp indicating when the content associated with the data object was placed on a web page, stored in a server, created, and so on.

Figure 1C:
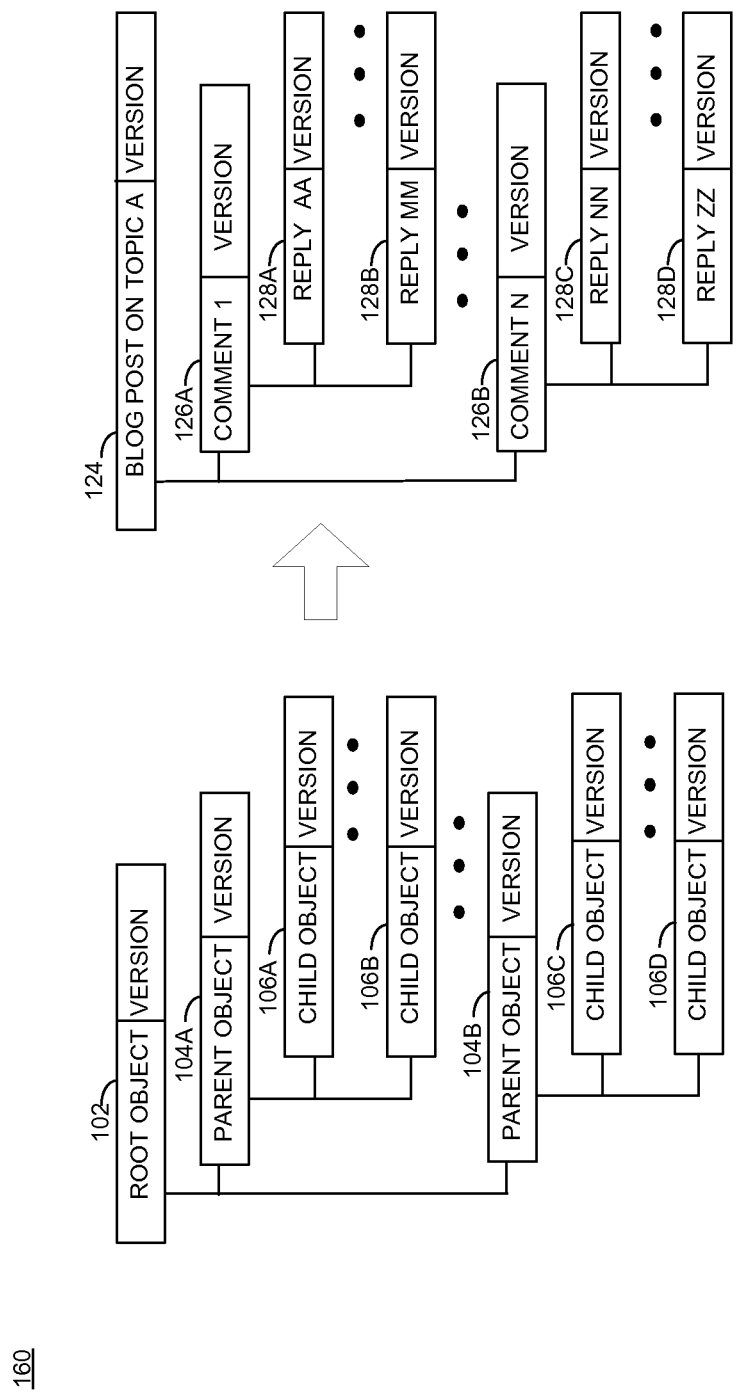
FIG. 1C illustrates an exemplary hierarchical structure of data objects representing web-based content from a web site.

FIG. 1C shows a hierarchical structure 160 of data objects stored on a web site. The hierarchical structure 160 may be associated with a blog listing. The web site may have a root object 102, multiple parent objects 104A-104B (collectively, '104'), where each parent object 104 may have several child objects 106A-106D (collectively, '106'). The web site may have a root object that corresponds to a blog post on topic A 124. The blog post 124 may have a parent object that corresponds to comment 1 126A and a parent object that corresponds to comment N 126B. Comment 1 126A may have a child object that corresponds to reply AA 128A and a child object that corresponds to reply MM 128B which also pertains to comment 1 126A. Comment N 126B may have a child object that corresponds to reply NN 128C which pertains to comment N 126B and a child object that corresponds to reply ZZ 128D which also pertains to comment N 126B. In this embodiment, a data object may be the blog post 124, comment 1 126A, comment N 126B, reply AA 128A, reply MM 128B, reply NN 128C, reply ZZ 128D, and any combination thereof.

Attention now turns to a detailed discussion of an exemplary system 200 embodying a browser cache assist for accessing web-based content. In several embodiments, the system 200 may be used to access files through a file hosting service. The system 200 may include a browser 202 coupled via a communication network 204 to a file hosting server 206. A browser 202 may be embedded on any type of computing device, such as, a personal computer, a server, a notebook computer, a laptop computer, a desktop computer, a personal digital assistant, a smart phone, a cellular telephone, a pager, a messaging device, a tablet computer, a handheld computer and the like.

A file hosting server 206 may be any type of web-accessible file storage system, such as a server, a web server, a network server, a storage server, a file sharing server, and the like. Examples of file hosting servers 206 are the Windows Live Sky Drive®, Google Docs, Box.net, and the like. The communication network 204 facilitates communications between a browser 202 and the file hosting server 206. The communication network 204 may embody any type of communications medium, such as wired or wireless networks, utilizing any communication protocol. In several embodiments, the communication network 204 may be the Internet.

The browser 202 may include a browser engine 208 and a file hosting service web application 210. The browser engine 208 renders a web page onto a display. The browser engine 208 may include a browser java script engine 212, a browser cache 214, and a browser rendering engine 216. The browser java script engine 212 executes or interprets java script programs which may be inserted into a web page. The browser cache 214 is temporary storage of web pages that may be reused. The browser rendering engine 216 renders a web page onto a display.

The file hosting service web application 210 interacts with the browser engine 208 so that a user may upload and access digital files stored on the file hosting server 206. The file hosting service web application 210 may include a database of web pages 228, a web application 222 having a web application cache 220 (also referred to as a "web app cache"), a database of Cascading Style Sheets (CSS) 224 and a database of images 226. The web app cache 220 may be used to store data objects associated with files on the file hosting server 206. The data objects may include metadata associated with a file, such as file size, last modified timestamp, and/or links used to access the file. The data objects may be used to generate web pages for use by a user in accessing the files stored on the file hosting server 206. The web application 222 may be used to generate web pages using the formatting information found in the CSS database 224, the images from the image database 226 and the data objects stored in the web app cache 220.

Figure 2:
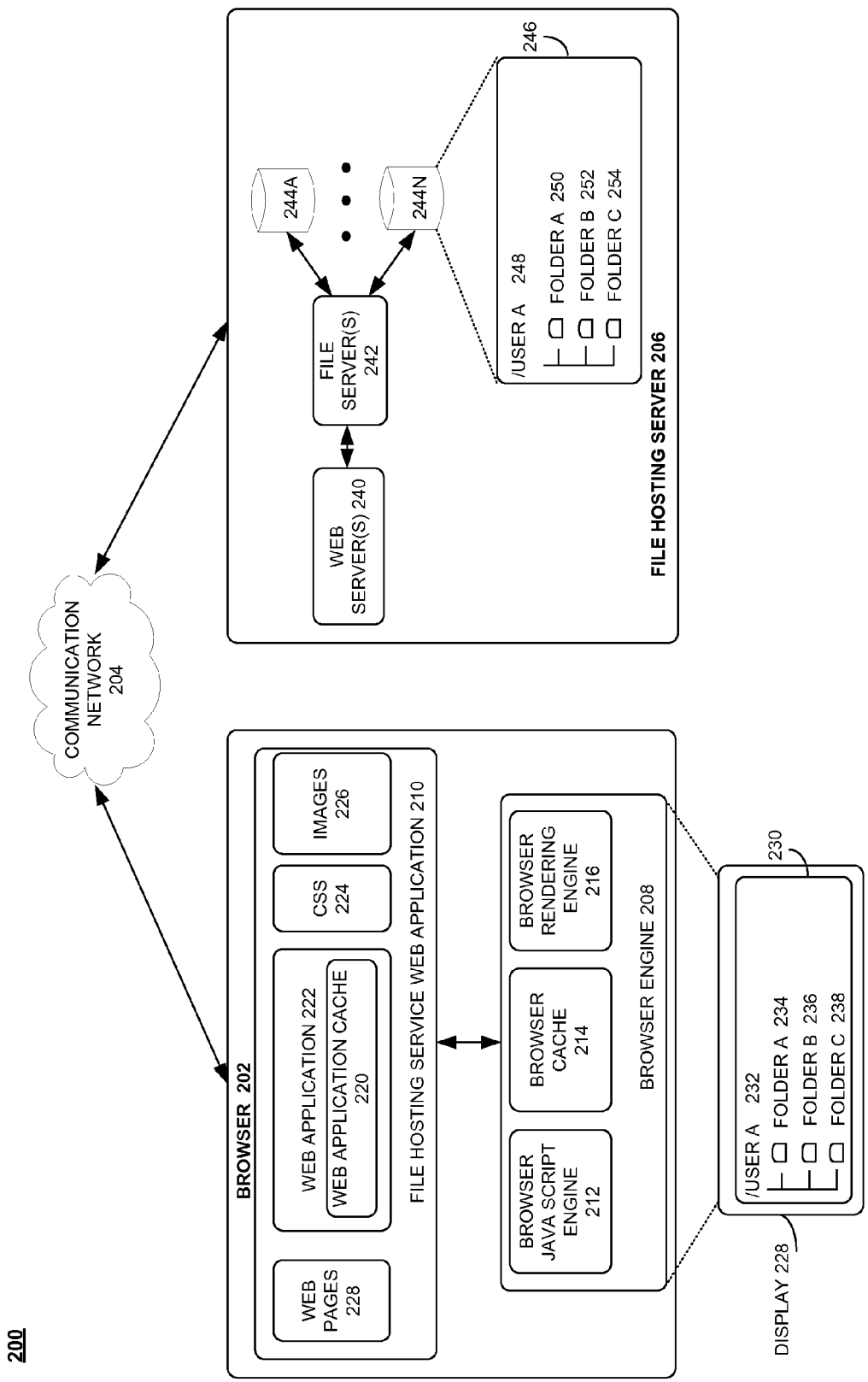
FIG. 2 illustrates an exemplary system using a browser cache assist for accessing web-based content.

A browser 202 may be communicatively coupled to a display 228 that displays a web page 230 showing the user's files stored on the file hosting server 206. As shown in FIG. 2, the web page 230 may illustrate that user A has a root directory 232 in the file hosting server 206 with three document folders: Folder A, 234; Folder B, 236; and Folder C, 238. The document folder names shown in web page 230 are actually a link to a location of the document folder which is otherwise referred to as a shortcut. The links are used to access the document folder quickly without opening the document folder from its actual location.

The file hosting server 206 may include one or more web servers 240, a file server 242, and one or more databases 244A-244N (collectively referred to as "244"). A web server 240 receives requests to load and access files to and from the file hosting server 206. The web server 240 may generate web pages in response to a user's request. For example, the web server 240 may generate a web page 246 which may be used to display the user's file system stored on the file hosting server 206. The web page 246 may be formatted in a markup language that contains data used to display the root directory 248 having Folder A 250, Folder B 252, and Folder C 254. The contents of these folders may be contained in one of the databases 244.

The various components of system 200 may be communicatively coupled via various types of communications medium as indicated by various lines or arrows. The components may coordinate operations between each other. The coordination may involve the uni-directional or bi-directional exchange of information. For instance, the components may communicate information in the form of signals communicated over the communications medium. The information may be implemented as signals allocated to various signal lines. In such allocations, each message is a signal. Further embodiments, however, may alternatively employ data messages. Such data messages may be sent various connections. Exemplary connections include parallel interfaces, serial interfaces, and bus interfaces.

Attention now turns to a more detailed discussion of operations for the embodiments with reference to various exemplary methods. It may be appreciated that the exemplary methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 3:
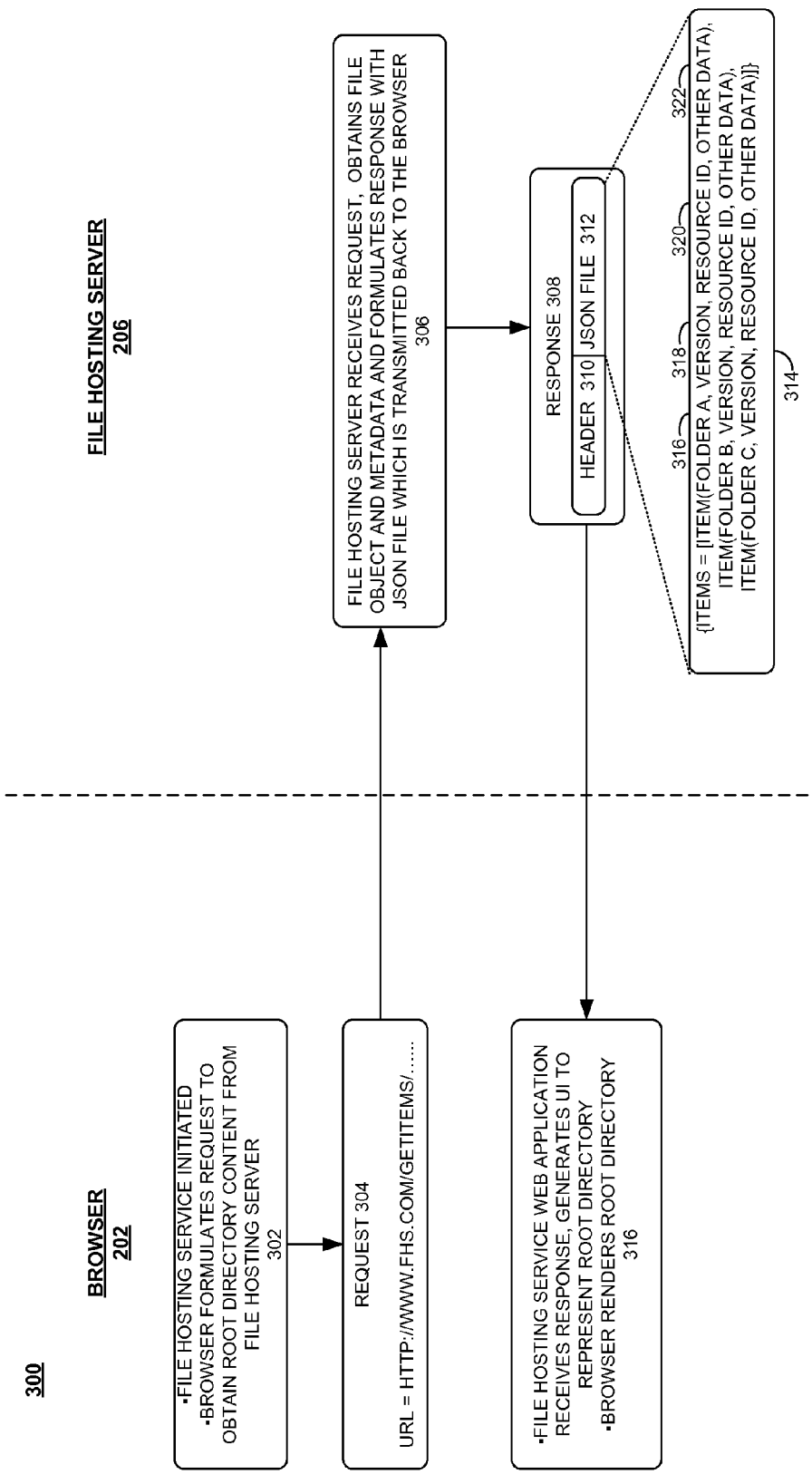
FIG. 3 is a flow chart illustrating an exemplary method for obtaining data objects representing web-based content associated with a root directory.

FIG. 3 illustrates a block diagram of an exemplary method 300 for obtaining a listing of the root directory of a user's file system on the file hosting server. It should be noted that the method 300 may be representative of some or all of the operations executed by one or more embodiments described herein and that the method can include more or less operations than that which is described in FIG. 3.

Referring to FIG. 3, the file hosting service web application 210 may be initiated when a user activates the file hosting service (block 302). The file hosting service may be activated when a user logs into the file hosting service's sign in. Alternatively, the file hosting service may be activated automatically when the browser is opened. In any case, the file hosting service web application 210 formulates a URL to request the user's root directory from the file hosting server 206. The URL may be implemented in the form of a Hypertext Transfer Protocol ("HTTP") request 304. The request 304 may include the URL of the file hosting server ("FHS") and tags indicating the data object requested, which in this case is for the user's root directory.

The file hosting server 206 receives the request (block 306). The file hosting server 206 formulates a response 308 that may include a header 310 and a Java Script Object Notation ("JSON") file 312. The header may be implemented as an HTTP header. The JSON file 312 contains the user's root directory that may be used by the file hosting service web application 210 to generate a user interface (UI) and/or web page that displays the user's root directory. It should be noted that the term user interface denotes any type of visual display such as, but not limited to, a web page, a user interface having windows, buttons, icons, etc., and the like. In some embodiments, only a few levels of the root directory may be obtained initially and the other levels retrieved later when the user requests them. The JSON file 312 contains data structures formatted in the JSON scripting language to represent the data objects representing the user's root directory.

As shown in FIG. 3, the JSON file 312 may include an array of items 314 where each item represents a folder in the user's root directory on the file hosting server 206. Each item may contain the name of the folder 316 (e.g., FOLDER A), a version 318 associated with the folder (e.g., VERSION), a resource identifier 320 associated with the folder (e.g., RESOURCE ID), and other data 322 associated with the folder. The version 318 may be a timestamp indicating the last date and time the folder was modified, the resource identifier 320 may be a unique identifier that the file hosting server 206 uses to uniquely identify the folder.

The file hosting service web application 210 receives the response 308 and may generate a user interface using the data contained in the JSON file (block 316). The browser renders a user interface thereby displaying the root directory to the user (block 316).

Figure 4:
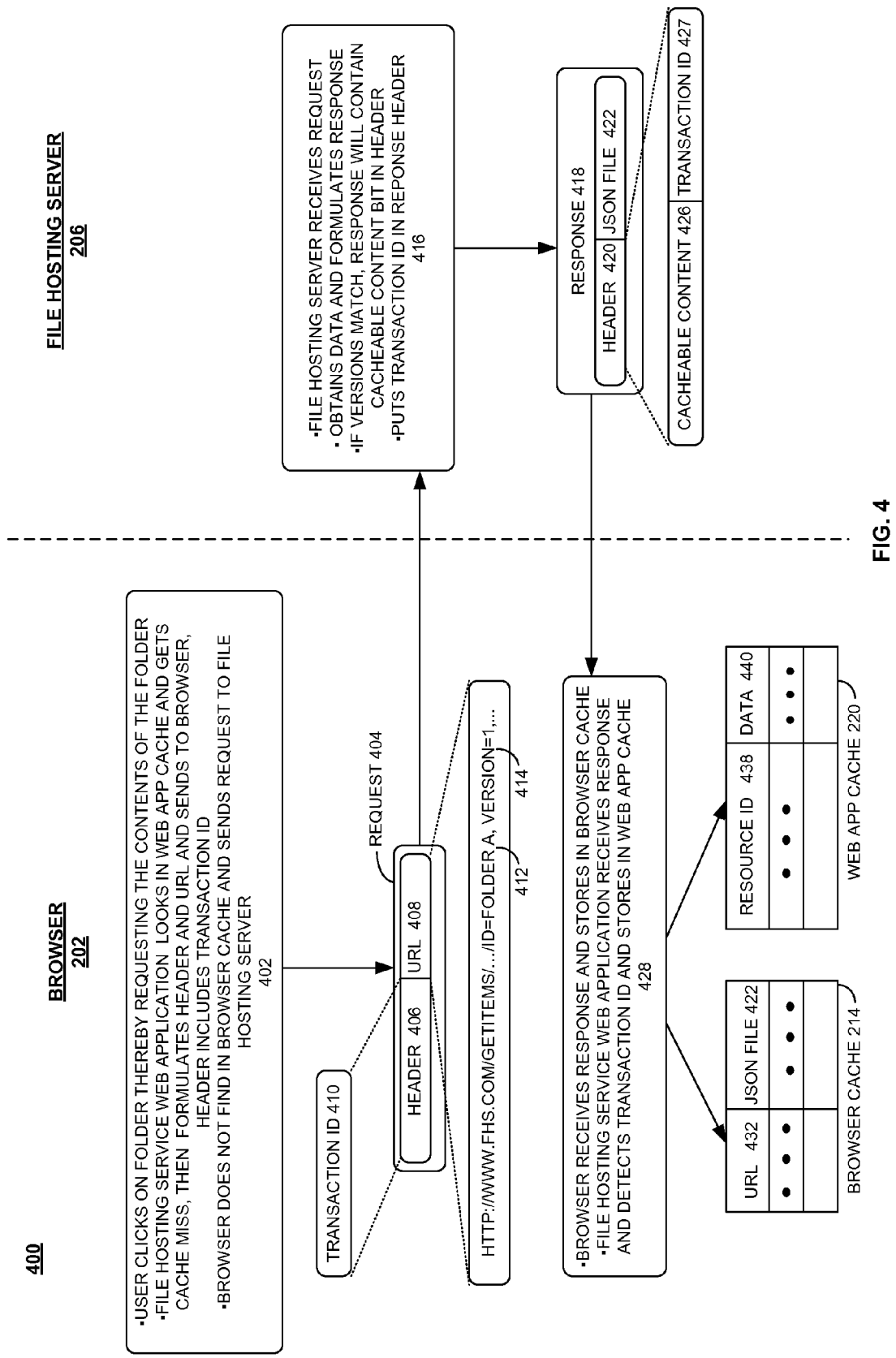
FIG. 4 is a flow chart illustrating an exemplary method for obtaining data objects from a file hosting server.

FIG. 4 illustrates an exemplary method 400 for obtaining a file folder stored on the file hosting server 206 for the first time during a browser session. It should be noted that the method 400 may be representative of some or all of the operations executed by one or more embodiments described herein and that the method can include more or less operations than that which is described in FIG. 4.

Referring to FIG. 4, a user may highlight a file folder displayed in a web page using a mouse click or keyboard stroke. The file hosting service web application 210 detects the user's action in highlighting the file folder and recognizes that the file hosting service web application 210 needs to obtain additional data objects to display the contents of the file folder on the web page. The file hosting service web application 210 searches for the data object pertaining to the file folder in the web app cache 220 using the resource identifier of the file folder (block 402).

When the file hosting service web application 210 does not find the data object in the web app cache 220, the file hosting service web application 210 generates a request 404 for the data object (block 402). The request 404 may include a header 406 having a transaction identifier 410 that uniquely identifies the request. The transaction identifier 410 may be a randomly generated number. The request 404 may include a URL 408 having an identifier field 412 that includes the name of the file folder (e.g., ID=FOLDER A) and a version field 414 that includes a version identifier (e.g., VERSION=1). The file hosting web application 210 passes the request 404 to the browser (block 402). The browser, in turn, searches for the URL in the browser cache 214 and does not find the URL in the browser cache 214 (block 402). Since this is the first time that the data object of FOLDER A is being requested, there may not be an entry for the URL in the browser cache 214 (block 402). The browser then sends the request 404 to the file hosting server 206 (block 402).

The file hosting server 206 receives the request 404 and obtains the requested data object (block 416). A response 418 is formulated which may include a header 420 and a JSON file 422 (block 416). The header 420 may contain a field that indicates whether or not the data appended to the header is cacheable or not (e.g., cacheable content). When the version identifier 414 in the request 404 matches the version identifier in the file hosting server 206, then the file hosting server 206 sets the cacheable content field 426 in the header 420 to indicate that the data object may be cached. The file hosting server 206 may also return the transaction identifier 427 back in the header 420 of the response 418 (block 416).

The file hosting web application 210 may use the transaction identifier 427 in the header of a response to recognize that the data object came from the file hosting server 206 rather than the browser cache 220. The data object retrieved from the file hosting server 206 is presumed to be more current than the data object stored in the browser cache 220 (block 428).

The browser 202 receives the response 418 and stores the data object in the browser cache 220 since the header indicates that the content is cacheable (block 428). The browser cache 220 may be accessed through the URL 432 to obtain the JSON file 422 stored therein.

The file hosting service web application 210 reads the response 418 to find the transaction identifier 427. The existence of a transaction identifier in the response 418 indicates that the data object came from the file hosting server 206 rather than the browser cache 220 thereby containing the most current data object. The file hosting service web application 210 stores the data objects in the web app cache 220 for reuse at a later point in time (block 428). The web app cache 220 is accessed through resource identifiers to obtain data 440 corresponding to a data object.

Figure 5:
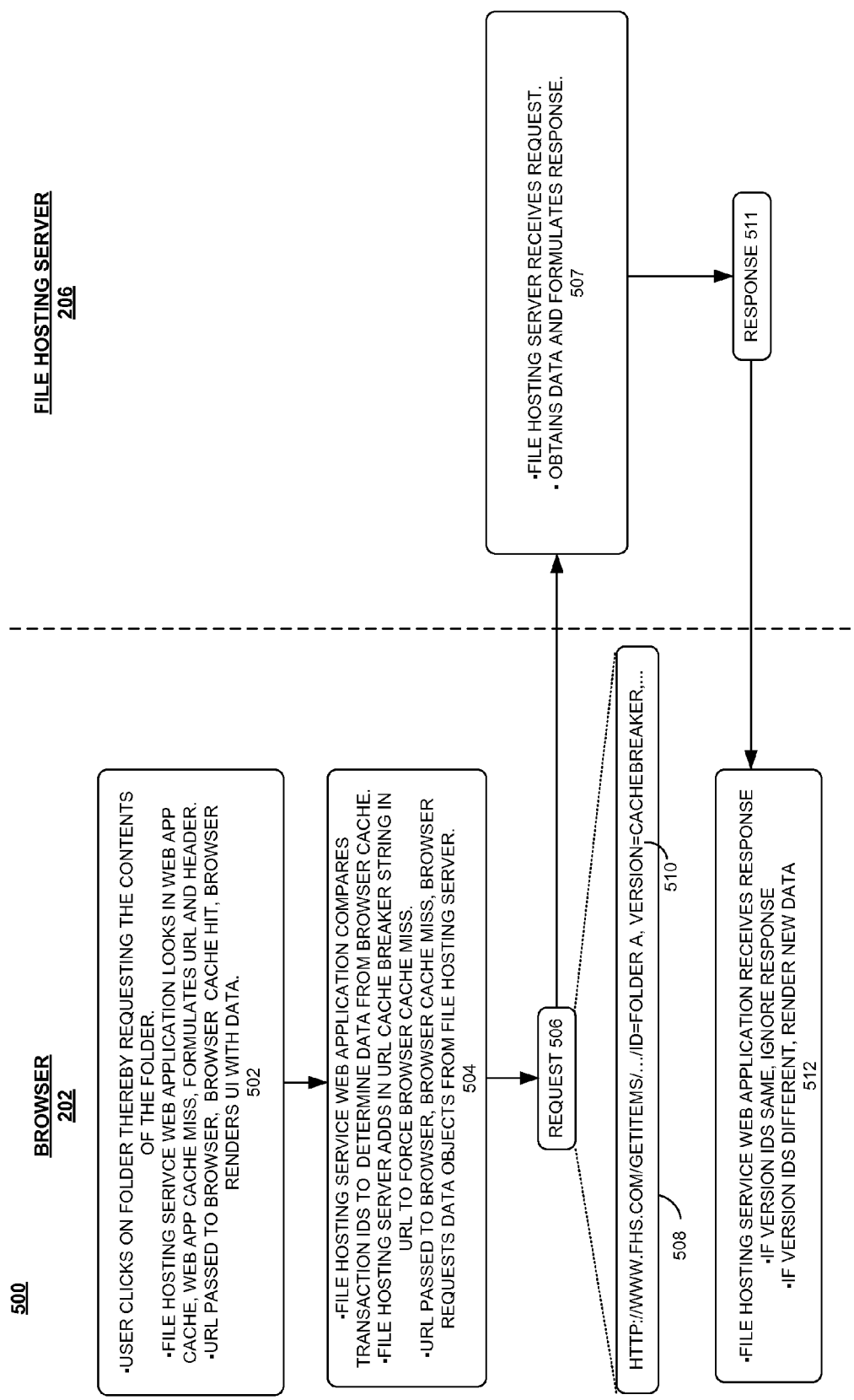
FIG. 5 is a flow chart illustrating an exemplary method for obtaining data objects already stored in a browser cache.

FIG. 5 illustrates an exemplary method 500 for obtaining data objects for a file folder that was accessed in a prior session of the web browser and which is being accessed in a current session of the web browser. When a web browser closes, the browser cache 220 may not be flushed. A browser cache 220 may be flushed in accordance with user-defined settings, through manual intervention by a user, or through a default setting. Since the data object may still be stored in the browser cache, the data object may be accessed from the browser cache. However, the copy of the data object in the browser cache may be stale and the web application fetches a current copy from the file hosting server 206.

Referring to FIG. 5, a user may click on a file folder that is displayed in a web page thereby requesting the contents of the file folder (block 502). The file hosting service web application 210 checks for the data object in the web app cache 220 where it is not found. The file hosting service web application 210 then formulates a URL and a header. The header contains a transaction identifier. The URL and header is passed to the browser. The browser uses the URL and finds the data object in the browser cache 220. The data object may still be in the browser cache 220 since the browser cache 220 may not have been flushed when the browser was closed. The browser may then render the data object in a user interface that is displayed (block 502).

The file hosting web application 210 compares the transaction identifier from the header with the transaction identifier stored in the browser cache 220 (block 504). The transaction identifiers may not match indicating that the data object came from the browser cache 220 and not the file hosting server 206 (block 504). In this case, there may be a possibility that the data object in the browser cache is not current or stale and the file hosting web application 210 prepares to retrieve a current copy from the file hosting server 206 (block 504). The file hosting web application 210 prepares a URL 508 that includes a cache breaker string in the version field 510 so that the browser does not find the data object in the browser cache (block 504). The URL 508 is passed to the browser where the browser does not find the URL in the browser cache and requests the data object from the file hosting server 206 (block 504).

The file hosting server 206 receives the request 506, obtains the data, and formulates a response 511 (block 507). The file hosting service web application 210 reads the response 511 (block 512). If the version identifier in the response 511 is the same as in the copy stored in the browser cache 220, then the web application ignores the response 511 (block 512). If the version identifier in the response 511 differs from the copy stored in the browser cache 220, the file hosting service web application 210 renders the portion of the data object received in the response 511 that differs from the data object from the browser cache onto a user interface that is displayed (block 512).

Figure 6:
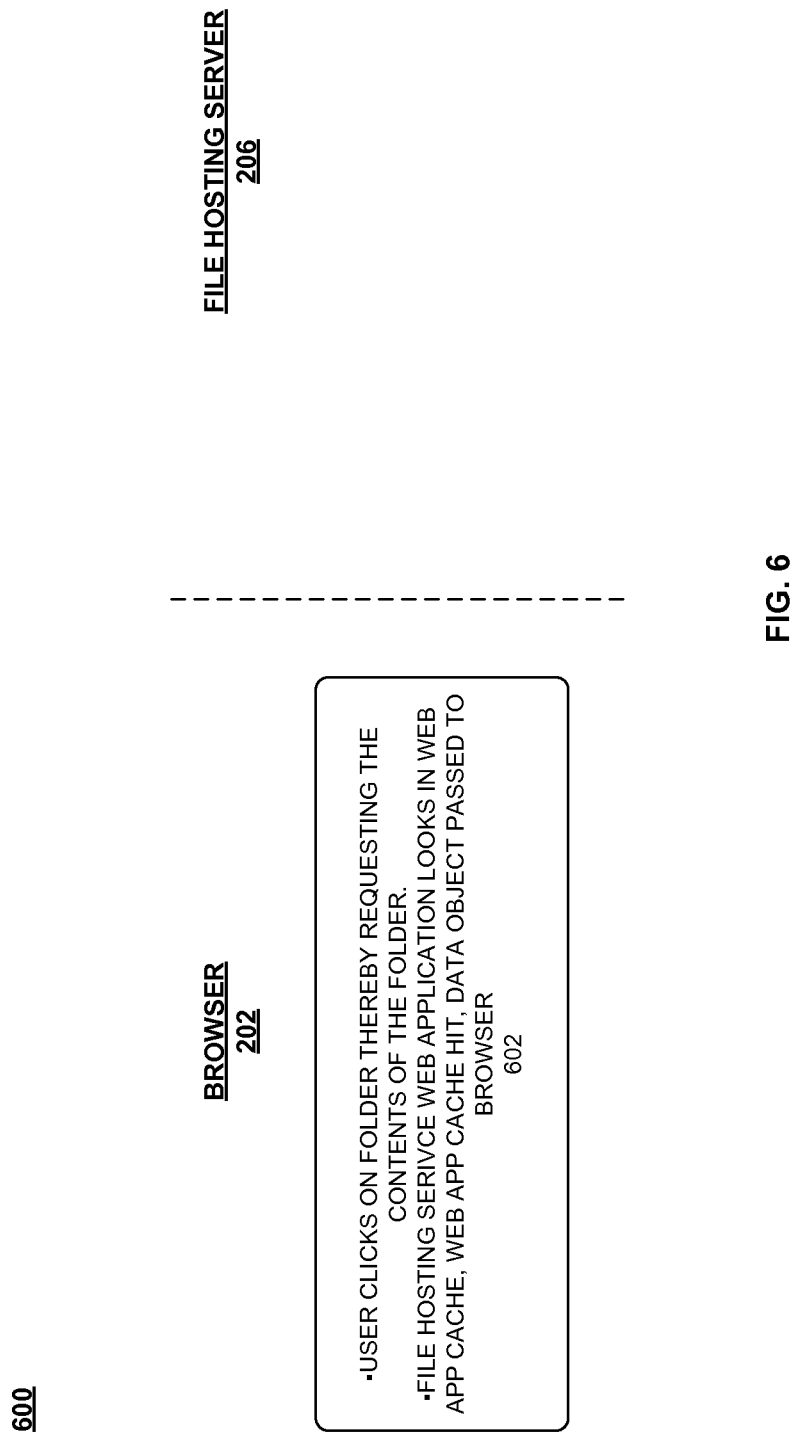
FIG. 6 is a flow chart illustrating an exemplary method for obtaining data objects already stored in a web app cache.

FIG. 6 illustrates an exemplary method 600 for obtaining a file folder stored on the file hosting server 206 from the web app cache 220. It should be noted that the method 600 may be representative of some or all of the operations executed by one or more embodiments described herein and that the method can include more or less operations than that which is described in FIG. 6.

Referring to FIG. 6, a user may highlight a file folder displayed in a web page using a mouse click or keyboard stroke. The file hosting service web application 210 detects the user's action in highlighting the file folder and recognizes that the file hosting service web application 210 needs to obtain an additional data object to display the contents of the file folder on the web page. The file hosting service web application 210 searches for the data object pertaining to the file folder in the web app cache 220 using the resource identifier of the file folder. The file hosting service web application 210 finds the data object in the web app cache 220 and uses it to update the web page currently displayed by the browser (block 602).

Figure 7:
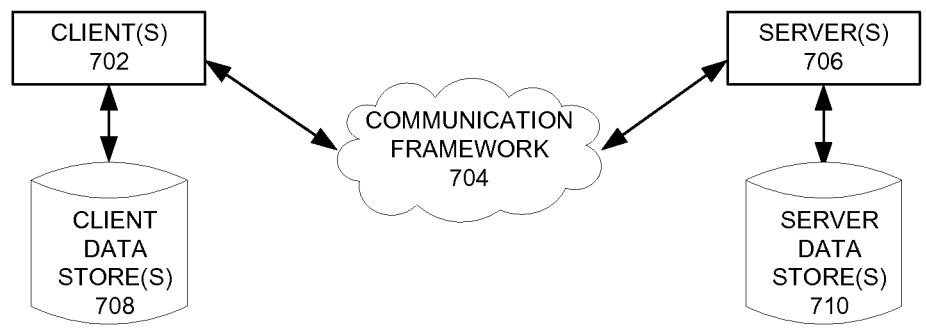
FIG. 7 is a block diagram illustrating an exemplary operating environment.

Attention now turns to a discussion of an exemplary operating environment. FIG. 7 illustrates an exemplary operating environment 700. It should be noted that the operating environment 700 is exemplary and is not intended to suggest any limitation as to the functionality of the embodiments. The operating environment 700 may be configured in a network environment, a distributed environment, a multiprocessor environment, or a stand-alone computing device having access to remote or local storage devices.

The operating environment 700 may include one or more client(s) 702 in communication through a communications framework 704 with one or more server(s) 706. In several embodiments, the browser 202 may executed within a client 702 and the server 706 may be implemented as the file hosting server 206.

A client 702 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 702 may also be embodied as a software module having instructions that execute in a single execution path, multiple concurrent execution paths (e.g., thread, process, etc.), or in any other manner.

A server 706 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 706 may also be embodied as a software module having instructions that execute in a single execution path, multiple concurrent execution paths (e.g., thread, process, etc.), or in any other manner.

The communications framework 704 facilitates communications between the client 702 and the server 706. The communications framework 704 may embody any type of communications medium, such as wired or wireless networks, utilizing any communication protocol.

Figure 8:
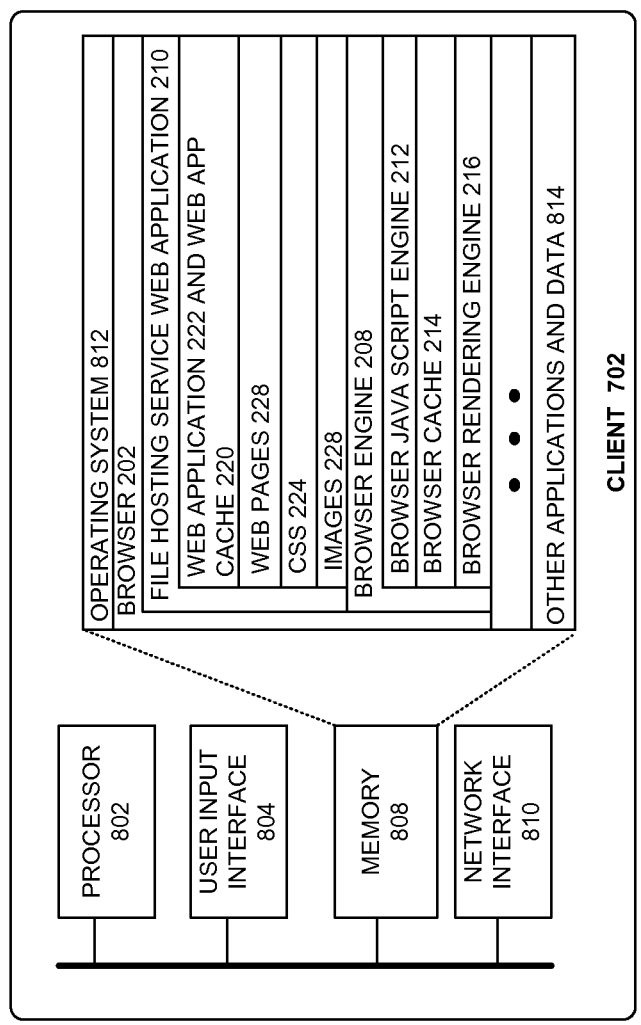
FIG. 8 is a block diagram illustrating an exemplary client.

Referring to FIG. 8, a client 702 may be configured to include a processor 802, a user input interface 804, a memory 808, and a network interface 810. The processor 802 may be any commercially available processor and may include dual microprocessors and multiprocessor architectures. The user input interface 804 accepts user input from input devices, such as a mouse, keyboard, touch screen, and the like. The network interface 810 facilitates wired or wireless communications between the client 702 and a communications framework 704 in order to provide a communications path between the browser 202 and the file hosting server 206. The network interface 810 may be used to facilitate network communications through the communications framework 704.

The memory 808 may be any computer-readable storage media or computer-readable media that may store processor-executable instructions, procedures, applications, and data. The computer-readable media does not pertain to propagated signals, such as a modulated data signal transmitted through a carrier wave. It may be any type of memory device (e.g., random access memory, read-only memory, etc.), magnetic storage, volatile storage, non-volatile storage, optical storage, DVD, CD, floppy drive, disk drive, flash memory, and the like. The memory 808 may also include one or more external storage devices or remotely located storage devices. The memory 808 may contain instructions and data as follows:
 an operating system 812;
 a browser 202 including a file hosting service web application 210 and a browser engine 208, the file hosting service web application 210 including a web application 222 having a web app cache 220, one or more web pages 228, a database of CSS 224, and a database of images 228, the browser engine 208 including a browser java script engine 212, a browser cache 214 and a browser rendering engine 216; and
 various other applications and data 814.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For example, various embodiments may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software components, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

In various embodiments, the embodiments described herein may comprise a computer-implemented system having multiple components, programs, procedures, modules. As used herein these terms are intended to refer to a computer-related entity, comprising either hardware, a combination of hardware and software, or software. For example, a component may be implemented as a process running on a processor, a hard disk drive, multiple storage drives (of optical and/or magnetic storage medium), an object, an executable, a thread of execution, a program, and/or a computer. By way of illustration, both an application running on a server and the server may be a component. One or more components may reside within a process and/or thread of execution, and a component may be localized on one computer and/or distributed between two or more computers as desired for a given implementation. The embodiments are not limited in this manner.

What is claimed:

1. A method implemented on a client device having at least one processor and a memory, the method comprising:
 storing in the client device one or more data objects in a web app cache, the data objects associated with data residing on a remote server;
 storing in the client device one or more of the data objects in a browser cache, each data object stored in the browser cache identified through an uniform resource locator (URL), a storage location of the web app cache differs from a storage location of the browser cache, at least one data object in the web app cache not in the browser cache;
searching for a first data object in the web app cache;
upon not finding the first data object in the web app cache, generating a request for the first data object, the request including a transaction identifier and a first URL, the first URL including a version of the first data object, the transaction identifier uniquely identifying a source of the request;
searching for the first data object in the browser cache using the first URL; and
upon finding the first data object in the browser cache:
rendering a user interface using the first data object stored in the browser cache; and
while rendering the user interface:
determining that the first data object from the browser cache is stale;
obtaining a second copy of the first data object from the remote server using a second URL, the second URL including a cache breaker string; and
rendering the second copy of the first data object in the user interface.

2. The method of claim 1, wherein determining that the first data object from the browser cache is stale, further comprises:
transmitting the request to the remote server;
receiving a response from the remote server including a copy of the first data object and a received transaction identifier;
storing the copy of the first data object in the web app cache when the received transaction identifier matches the transaction identifier used in the request.

3. The method of claim 1, further comprising:
when the first data object is not found in the browser cache:
requesting the first data object from the remote server, the request including a version identifier;
receiving a response including a copy of the first data object from the remote server with an indication to cache the first data object in the browser cache, wherein the indication to cache the first data object is set by the remote server when the version identifier in the request matches the version of the first data object in the remote server.

4. The method of claim 3, further comprising:
storing the first data object in the web app cache when the transaction identifier in the request matches a transaction identifier received in the response.

5. The method of claim 1, wherein the first data object is one of a root directory, a parent directory, a child directory, or a file stored in a hierarchical structure.

6. The method of claim 1, wherein the remote server is one of a file hosting server or a social networking web site.

7. The method of claim 1, wherein upon finding the first data object in the browser cache, further comprises:
ignoring the second copy of the first data object upon determining that the second copy of the first data object is not a current copy of the first data object.

8. A computer-readable storage medium storing thereon one or more programs for execution by one or more processors of a client device, the one or more programs comprising processor-executable instructions that when executed perform the actions of:
storing in the client device one or more data objects in a web app cache, the data objects associated with data residing on a remote server;
storing in the client device one or more data objects in a browser cache, each data object stored in the browser cache identified through an uniform resource locator (URL), a storage location of the browser cache differs from a storage location of the web app cache, at least one data object in the web app cache not in the browser cache;
searching for a first data object in the web app cache;
upon not finding the first data object in the web app cache, generating a request for the first data object, the request including a transaction identifier and a first URL, the first URL including a version of the first data object, the transaction identifier uniquely identifying a source of the request;
searching for the first data object in the browser cache using the URL; and
upon finding the first data object in the browser cache:
rendering a user interface having the first data object stored in the browser cache;
while rendering the user interface:
determining that the copy of the first data object from the browser cache is stale;
obtaining a second copy of the first data object from the remote server using a second URL, the second URL including a cache breaker string; and
rendering the second copy of the first data object in the user interface upon determining that the second copy of the first data object is a current copy of the first data object.

9. The computer-readable storage medium of claim 8, wherein determining that the copy of the first data object from the browser cache is stale performs further actions comprising:
receiving a response from the remote server including a copy of the first data object and a received transaction identifier;
storing the copy of the first data object in the web app cache when the received transaction identifier matches the transaction identifier used in the request.

10. The computer-readable storage medium of claim 8, further comprising processor-executable instructions that when executed perform the actions of:
when the first data object is not found in the browser cache:
requesting the first data object from the remote server, the request including a version identifier;
receiving a response including the first data object from the remote server with an indication to cache the first data object in the browser cache, wherein the indication to cache the first data object is set by the remote server when the version identifier in the request matches the version of the first data object in the remote server.

11. The computer-readable storage medium of claim 8, further comprising processor-executable instructions that when executed perform the actions of:
storing the first data object in the web app cache when the transaction identifier in the request matches a transaction identifier received in the response.

12. The computer-readable storage medium of claim 8, wherein the first data object is one of a root directory, a parent directory, a child directory, or a file stored in a hierarchical structure.

13. The computer-readable storage medium of claim 8, wherein the remote server is one of a file hosting server or a social networking web site.

14. The computer-readable storage medium of claim 8, wherein upon finding the first data object in the browser cache, performs further actions comprising:

ignoring the second copy of the first data object in the user interface upon determining that the second copy of the first data object is not a current copy of the first data object.

15. A system, comprising:

a client device having at least one processor and a memory;

the memory comprising:

a browser configured to execute on the client device;

a web application configured to execute within the browser;

a web app cache storing one or more data objects comprising data stored on a remote server; and a browser cache storing one or more of the data objects, each data object stored in the browser cache identified by a uniform resource locator (URL), a storage location of the web app cache differs from a storage location of the browser cache, at least one data object stored in the web app cache not in the browser cache;

wherein:

the web application searches for a first data object in the web app cache, upon not finding the first data object in the web app cache, generating a request for the first data object, the request including a transaction identifier and a first URL, the first URL including a version of the first data object, the transaction identifier uniquely identifying a source of the request;

the browser using the first URL to search for the first data object in the browser cache, upon finding the first data object in the browser cache, the browser renders a user interface including the first data object;

the web application concurrently with the browser rendering the user interface, determines that the first data object is stale and obtains a second copy of the first data object from the remote server using a second URL, the second URL including a cache breaker string; and the browser renders the user interface with the second copy of the first data object.

16. The system of claim 15, wherein the web application stores the copy of the first data object in the web app cache when a transaction identifier received in response to obtaining the second copy matches the transaction identifier used in the request.

17. The system of claim 15, wherein the web application ignores the second copy of the first data object in the user interface upon determining that the second copy of the first data object is not a current copy of the first data object.

18. The system of claim 15, wherein the web application stores the first data object in the web app cache when the transaction identifier in the request matches the transaction identifier received in the response.

19. The system of claim 15, wherein the first data object wherein the first data object is one of a root directory, a parent directory, a child directory, or a file stored in a hierarchical structure.

20. The system of claim 15, wherein the remote server is one of a file hosting server or a social networking web site.

* * * * *